(12) United States Patent
Nicholson et al.

(10) Patent No.: US 11,538,199 B2
(45) Date of Patent: Dec. 27, 2022

(54) DISPLAYING A WINDOW IN AN AUGMENTED REALITY VIEW

(71) Applicant: LENOVO (Singapore) PTE. LTD., New Tech Park (SG)

(72) Inventors: John Weldon Nicholson, Cary, NC (US); Daryl C. Cromer, Raleigh, NC (US); Howard Locker, Cary, NC (US)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 120 days.

(21) Appl. No.: 16/784,544

(22) Filed: Feb. 7, 2020

(65) Prior Publication Data
US 2021/0248786 A1 Aug. 12, 2021

(51) Int. Cl.
| G06T 11/00 | (2006.01) |
| G06T 3/20 | (2006.01) |
| G06T 3/40 | (2006.01) |
| G06T 3/60 | (2006.01) |

(52) U.S. Cl.
CPC ........... *G06T 11/00* (2013.01); *G06T 3/20* (2013.01); *G06T 3/40* (2013.01); *G06T 3/60* (2013.01); *G06T 2200/24* (2013.01)

(58) Field of Classification Search
None
See application file for complete search history.

(56) References Cited

U.S. PATENT DOCUMENTS

| 9,711,072 B1* | 7/2017 | Konttori | G06F 3/013 |
| 2014/0168262 A1* | 6/2014 | Forutanpour | G06T 19/006 |
| | | | 345/633 |
| 2015/0070386 A1* | 3/2015 | Ferens | G06F 3/013 |
| | | | 345/633 |
| 2015/0145887 A1* | 5/2015 | Forutanpour | G02B 27/017 |
| | | | 345/633 |
| 2015/0248783 A1* | 9/2015 | Fayle | H04W 4/02 |
| | | | 345/633 |
| 2015/0254905 A1* | 9/2015 | Ramsby | G06T 3/40 |
| | | | 345/419 |
| 2015/0301334 A1* | 10/2015 | Getin | G02B 27/0101 |
| | | | 345/633 |
| 2015/0338915 A1* | 11/2015 | Publicover | H04N 5/23229 |
| | | | 345/633 |
| 2016/0055268 A1* | 2/2016 | Bell | G06T 19/00 |
| | | | 703/1 |
| 2016/0078680 A1* | 3/2016 | Reif | G06F 1/163 |
| | | | 345/633 |
| 2016/0379418 A1* | 12/2016 | Osborn | G02B 27/0172 |
| | | | 345/589 |
| 2017/0249860 A1* | 8/2017 | Osterhout | G02B 7/023 |
| 2017/0256096 A1* | 9/2017 | Faaborg | G06T 19/003 |
| 2018/0275745 A1* | 9/2018 | Crisler | G06V 10/255 |
| 2018/0324404 A1* | 11/2018 | Sevigny | H04N 13/117 |
| 2019/0073821 A1* | 3/2019 | Nourai | G06F 3/011 |

(Continued)

*Primary Examiner* — Michael J Cobb
(74) *Attorney, Agent, or Firm* — Kunzler Bean & Adamson

(57) ABSTRACT

For displaying a window in an augmented reality view, a processor detects a new augmented reality placetime that includes a new augmented reality position and/or a new augmented reality time of an augmented reality device. The processor calculates new window characteristics for a window at the new augmented reality placetime based on previous window characteristics. The processor further displays the window with the new window characteristics.

20 Claims, 7 Drawing Sheets

(56) References Cited

U.S. PATENT DOCUMENTS

| | | | |
|---|---|---|---|
| 2019/0258365 A1* | 8/2019 | Zurmoehle | G06F 3/04845 |
| 2019/0287495 A1* | 9/2019 | Mathur | G09G 5/391 |
| 2020/0064456 A1* | 2/2020 | Xu | G01S 7/417 |
| 2020/0225673 A1* | 7/2020 | Ebrahimi Afrouzi | G05D 1/0016 |
| 2020/0401687 A1* | 12/2020 | Mak | G06F 21/33 |
| 2021/0027537 A1* | 1/2021 | Olah-Reiken | G06T 19/003 |

* cited by examiner

DISPLAYING A WINDOW IN AN AUGMENTED REALITY VIEW

FIELD

The subject matter disclosed herein relates to displaying a window and more particularly relates to displaying a window in an augmented reality view.

BACKGROUND

Augmented reality views change when the environment of an augmented reality device changes.

BRIEF SUMMARY

An apparatus for displaying a window in an augmented reality view is disclosed. The apparatus includes a processor and a memory that stores code executable by the processor. The processor detects a new augmented reality placetime comprising a new augmented reality position and/or a new augmented reality time of an augmented reality device. The processor calculates new window characteristics for a window at the new augmented reality placetime based on previous window characteristics. The processor further displays the window with the new window characteristics. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
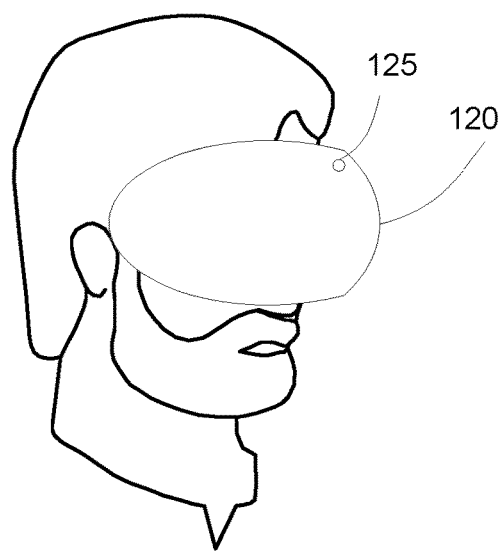
FIG. 1A is a perspective drawing illustrating one embodiment of an augmented reality device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C"

programming language, or the like, and/or machine languages such as assembly languages. The code may execute entirely on the user's computer, partly on the user's computer, as a stand-alone software package, entirely or partly on a head mounted display such as an augmented reality device, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a perspective drawing illustrating one embodiment of an augmented reality (AR) device 120. In the depicted embodiment, the AR device 120 includes a camera 125. The AR device 120 may be worn by a user who views a display within the AR device 120. The AR view of the AR device 120 may include both the environment and images that are presented on the display by the AR device 120.

Figure 1B:
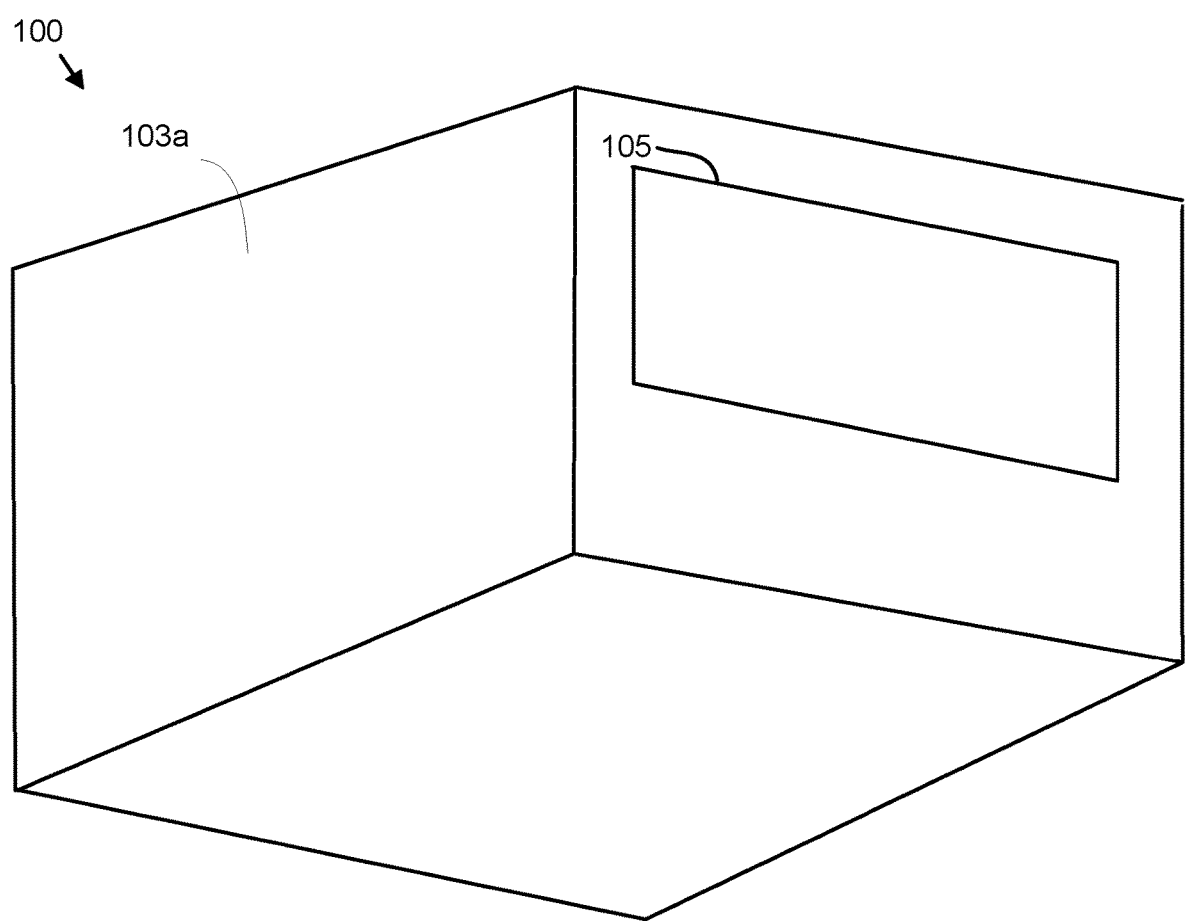
FIG. 1B is a perspective drawing illustrating one embodiment of an augmented reality view.

FIG. 1B is a perspective drawing illustrating one embodiment of an AR view 100. The AR view 100 is presented to the user by a display of the AR device 120. The AR view 100 includes the environment 103a. The AR view 100 further includes a window 105 that comprises video, graphics, text, and the like that is superimposed over the environment 103a by the AR device 120. Although the window 105 is depicted as a flat screen, the window 105 may be presented with any shape and in either two or three dimensions. In one embodiment, the window 105 is presented as though disposed on a surface of the environment 103a. For example, a television window 105 may be presented as though disposed on a wall of a room.

Figure 1C:
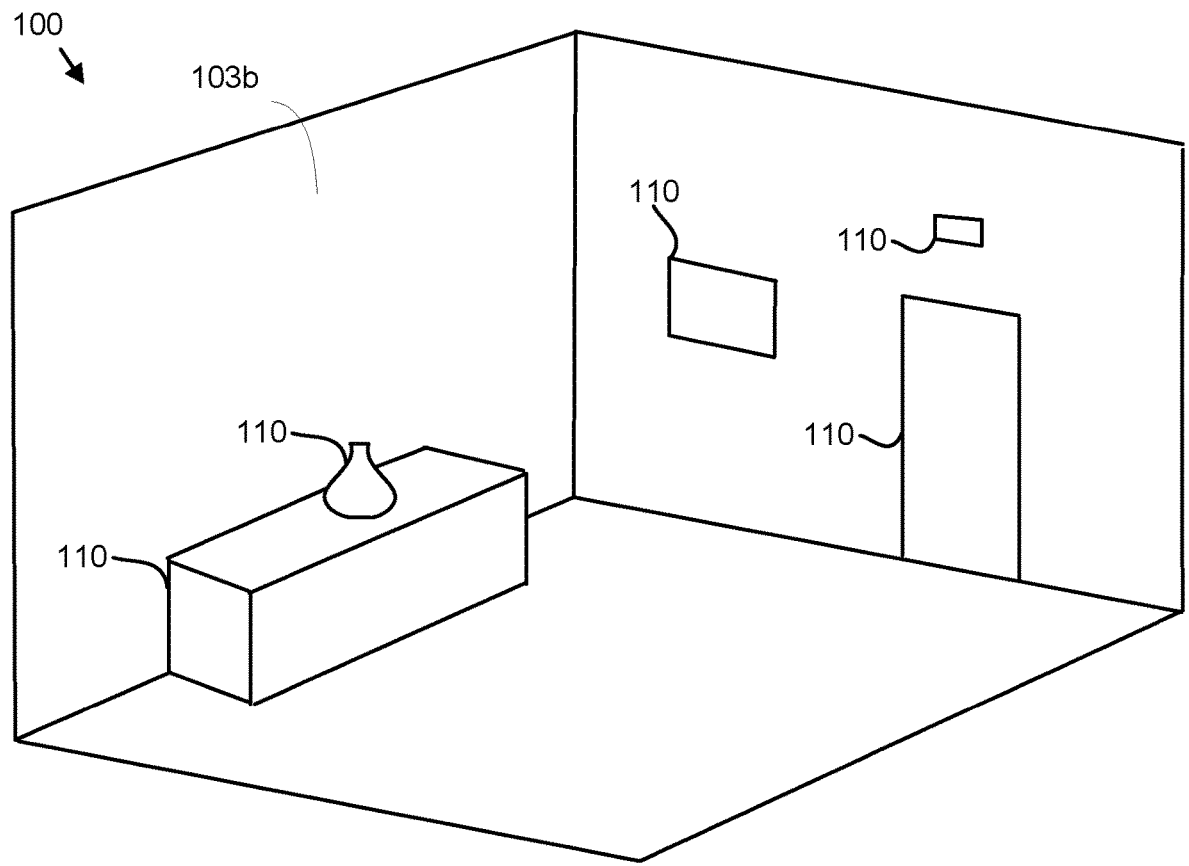
FIG. 1C is a perspective drawing illustrating one alternate embodiment of an augmented reality view.

FIG. 1C is a perspective drawing illustrating one alternate embodiment of an AR view 100. In the depicted embodiment, a new environment 103b is captured by the camera 125 at a different AR position and/or AR time from the given AR position and time of the environment 103a of FIG. 1B. The new environment 103b includes objects 110 that were not in the previous environment 103a. As a result, displaying the window 105 at the same location in the new environment 103b as was used in the original environment 103a may not be desirable.

Unfortunately, the user may wish to view the window 105. Because presenting the window 105 at the same location of the previous environment 103a would degrade the user's viewing experience, the embodiments determine a new location and other window characteristics for the window 105 in the new environment 103b. The embodiments detect a new AR placetime for the AR device 120 and calculate new window characteristics for the window 105 at the new AR placetime based on previous window characteristics at a previous environment 103a. In addition, the embodiments display the window 105 with the new characteristics. As a result, the window 105 is automatically repositioned to a new location within the new environment 103b, improving the efficiency and efficacy of the AR device 120 as will be described hereafter.

Figure 2A:
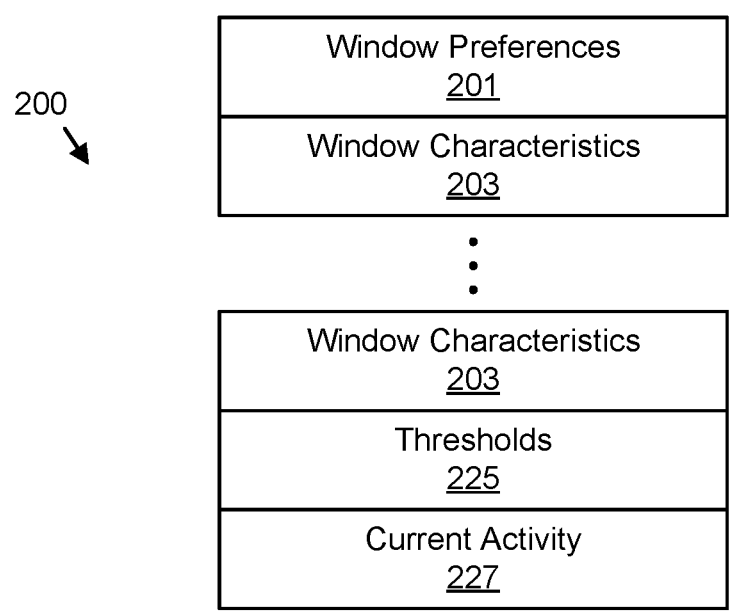
FIG. 2A is a schematic block diagram illustrating one embodiment of augmented reality data.

FIG. 2A is a schematic block diagram illustrating one embodiment of AR data 200. The AR data 200 may be used to calculate the new window characteristics 203 for the window 105 and display the window 105 with the new window characteristics 203. The AR data 200 may be organized as a data structure in a memory. In the depicted embodiment, the AR data 200 includes window preferences 201, one or more window characteristics 203, thresholds 225, and current activity 227.

The window preferences 201 may record user preferences for the placement of windows 105 within an AR view 100. The window preferences 201 may include a preferred window angular size, a docking preference, a preferred window angular orientation, and/or a preferred window density. The preferred window angular size may specify a maximum window angular size, a minimum angular window size, and/or an average window angular size. The window angular size is an apparent maximum window dimension measured in degrees of the window 105 as seen from the user's eye. Alternatively, the window angular size may be measured in pixels.

The docking preference may specify whether a window 105 is presented as docked, wherein the window 105 appears disposed on a surface such as a wall, or presented undocked as though floating in the air. The preferred window angular orientation may specify a maximum angular difference between a vector from the user's eye to the center of the window 105, and an apparent normal vector radiating from the center of the window 105. The preferred window density may specify a percentage of the AR view 100 over which windows 105 are overlaid. In one embodiment, the preferred window density is for a specified view angle such as a 30 degree angle as measured from the user's eye. Alternatively, the preferred window density may be for the total pixels presented by the AR device 120.

The window characteristics 203 describe presentation characteristics of a window 105. The window characteristics 203 are described in more detail in FIG. 2B. The thresholds 225 include one or more thresholds used to make automatic decisions. The current activity 227 records the current activity of the user with the AR device 120 in the environment 103.

Figure 2B:
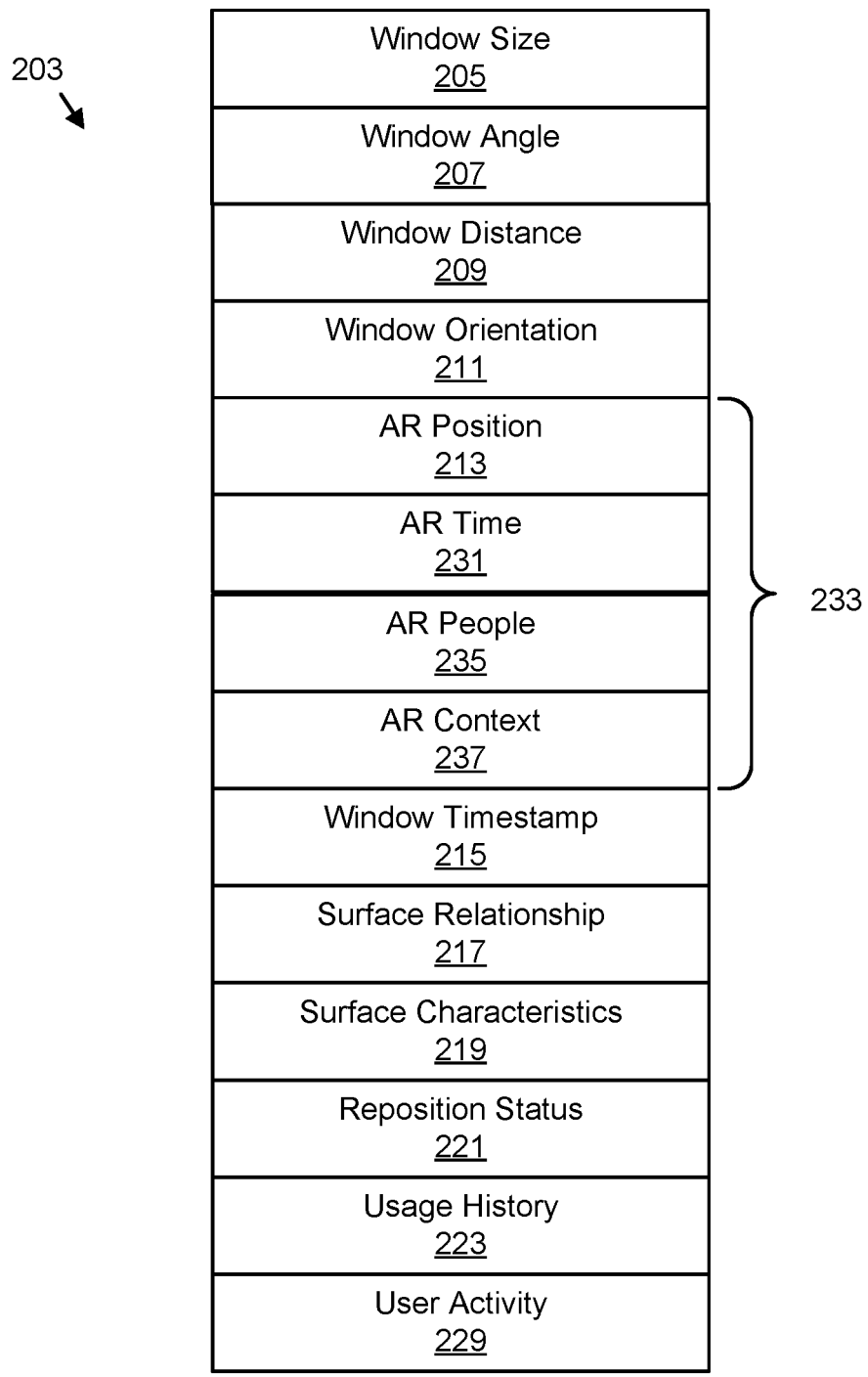
FIG. 2B is a schematic block diagram illustrating one embodiment of window characteristics.

FIG. 2B is a schematic block diagram illustrating one embodiment of the window characteristics 203. The window characteristics 203 maybe organized as a data structure in a memory. In the depicted embodiment, the window characteristics 203 include a window size 205, a window angle 207, a window distance 209, a window orientation 211, the AR position 213, the AR time 231, AR people 235, an AR context 237, a window timestamp 215, a surface relationship 217, surface characteristics 219, a reposition status 221, a usage history 223, and user activity 229. An AR placetime 233 may comprise the AR position 213, AR time 231, AR people 235, and/or AR context 237.

The window size 205 may record the size of the window 105 as an angle is viewed from the user's eye and/or in pixels. For example, a window 105 may have a window size 205 of 15 degrees and/or 300 pixels. The window angle 207 may specify an angle of an apparent normal vector from a center of the window to a vector from the user's eye to the center of the window 105. The window distance 209 may be an apparent distance in the environment 103 from the user's eye to the window 105. The window orientation 211 may record whether the window 105 is presented in landscape or portrait.

The AR position 213 specifies the position of the window 105 within the AR view 100. The AR time 231 may record a time interval when the window 105 was displayed at the AR position 213. The AR people 235 may record other people in the AR view 100 when the window 105 was displayed. The AR context 237 records the context of usage of the AR device 120 and/or activity displayed in the AR view 100.

The window timestamp 215 records when the window 105 was last displayed using the window characteristics 203. The surface relationship 217 records whether the window 105 was docked to a surface such as a wall. The surface characteristics 219 record characteristics of any surface that the window 105 was docked to. The surface characteristics 219 may include a surface color, a surface uniformity, and object density, and the like. The surface color may record the average color of the surface. The surface uniformity may record an average deviation from the surface color across the surface. The object density may record a percentage of the surface area of the surface that includes objects that form discontinuities in the surface.

The reposition status 229 records details of the last repositioning of the window 105 within the AR view 100. The usage history 223 records uses of the window 105. The user activity 229 records other interactions of the user with the AR view 100 while the window 105 was active.

Figure 3:
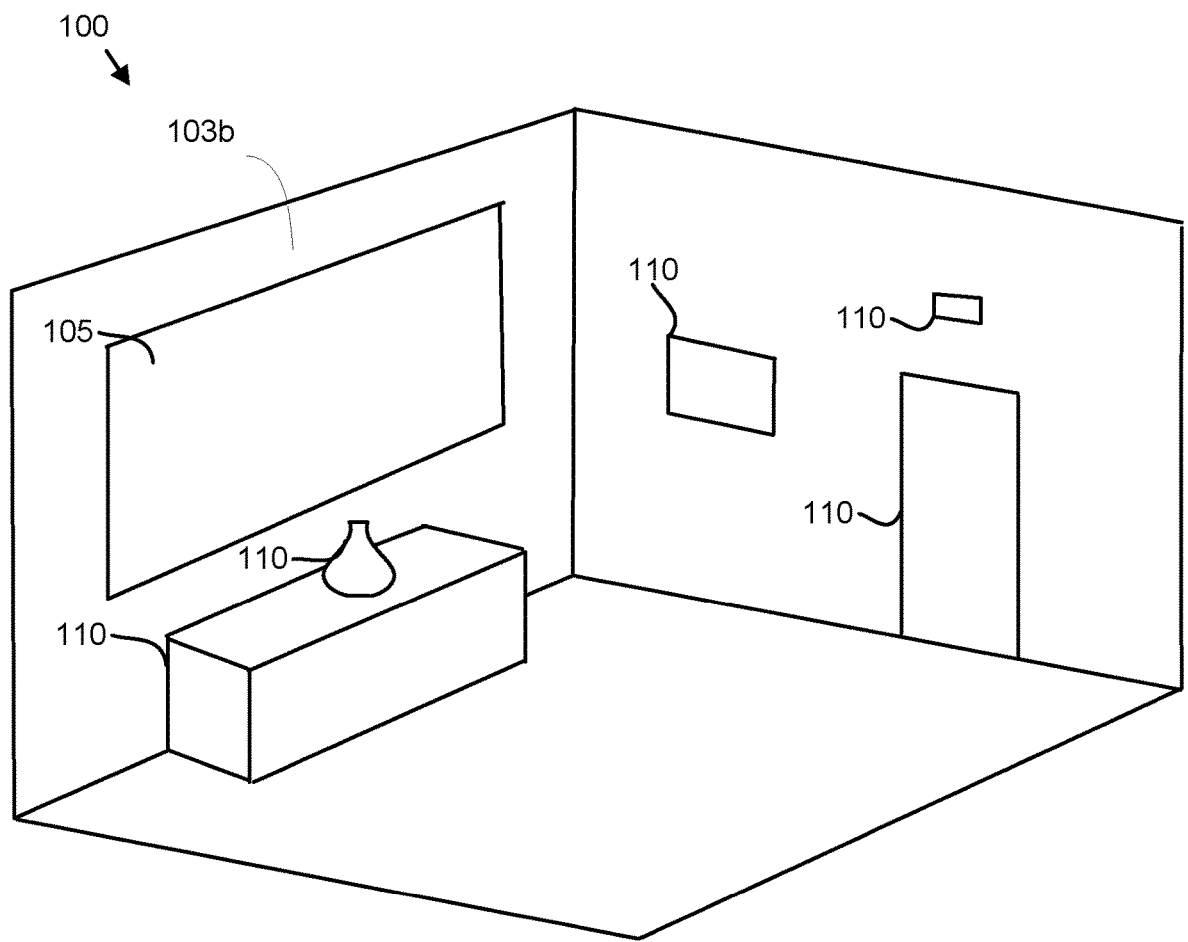
FIG. 3 is a perspective drawing illustrating one embodiment of an augmented reality view with new window characteristics.

FIG. 3 is a perspective drawing illustrating one embodiment of an AR view 100 with new window characteristics 203. The AR view 100 of the new environment 103b of FIG. 1C is shown. The window 105 is displayed with new window characteristics 203 that conform to the new, current environment 103b. As a result, the user may view the window 105 in the new environment 103b, giving user access to customary information in the window 105 and improving the function and efficiency of the AR device 120.

Figure 4:
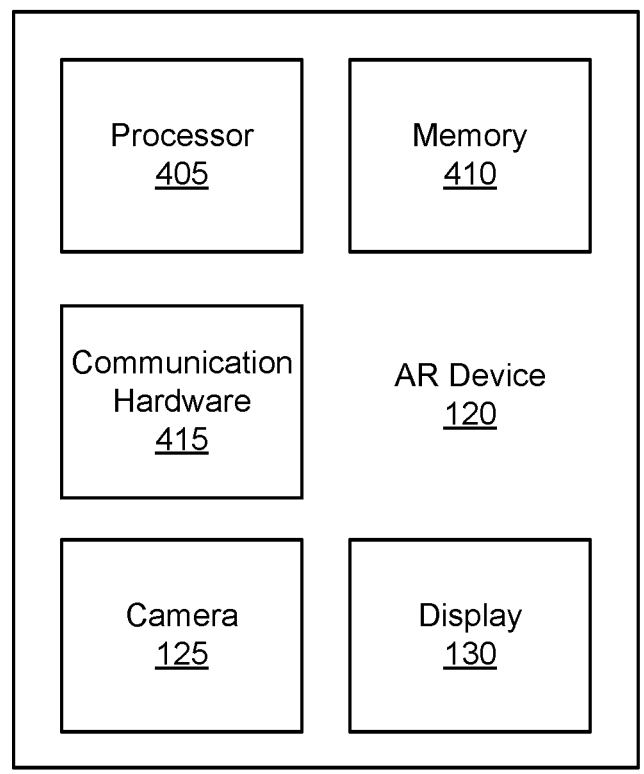
FIG. 4 is a schematic block diagram illustrating one embodiment of a computer.

FIG. 4 is a schematic block diagram illustrating one embodiment of the AR device 120. In the depicted embodiment, the AR device 120 includes a processor 405, a memory 410, communication hardware 415, the camera 125, and a display 130. The memory 410 may comprise a semiconductor storage device. The memory 410 stores code.

The processor 405 executes the code. The communication hardware 415 communicates the camera 125, the display 130, and/or with other devices such as a network, server, and/or computer. The display 130 may be disposed in the AR device 120 and may be an optical engine of the AR device 120.

Figure 5:
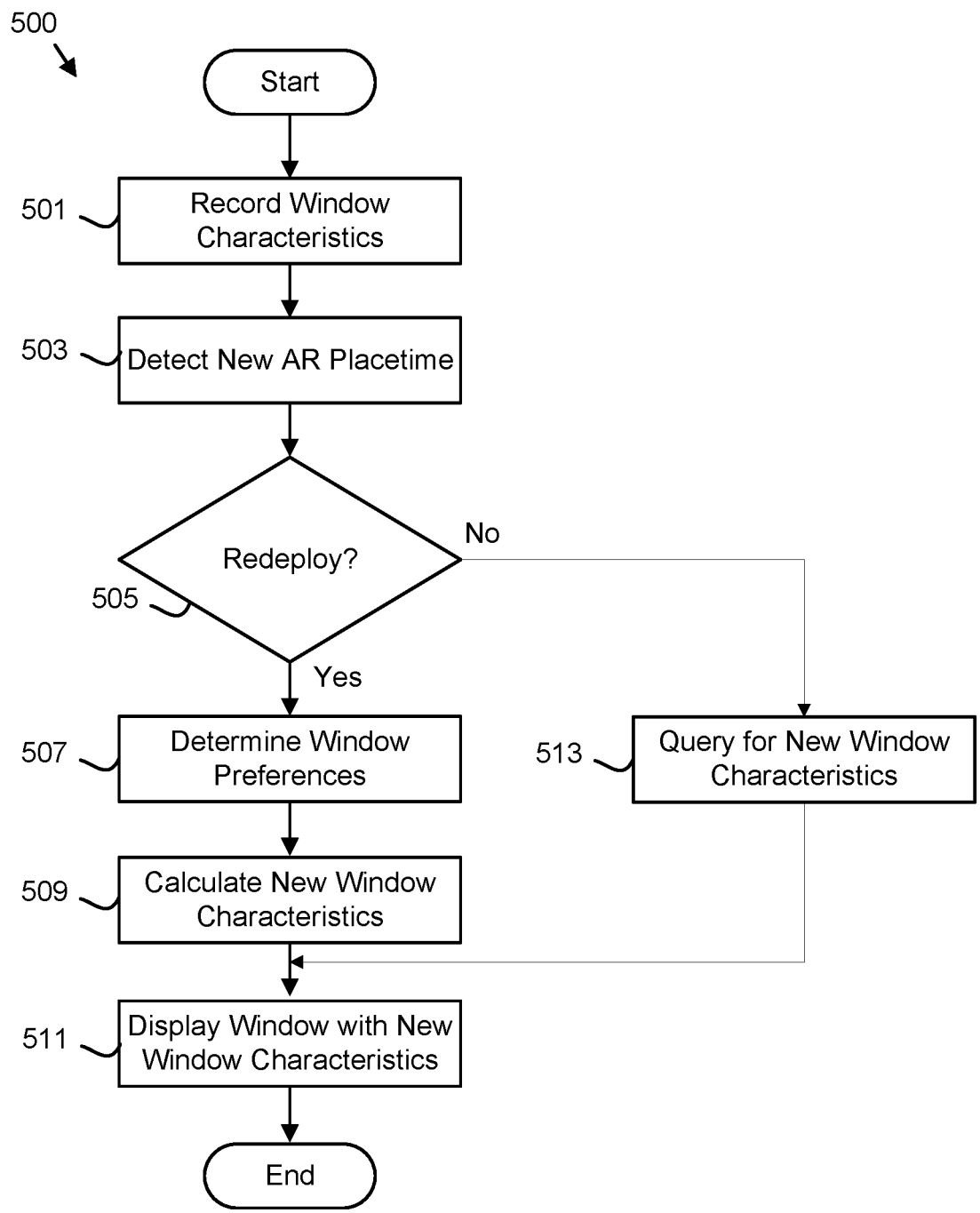
FIG. 5 is a schematic flow chart diagram illustrating one embodiment of a window display method.

FIG. 5 is a schematic flow chart diagram illustrating one embodiment of a window display method 500. The method 500 may display the window 105 with the new window characteristics 203. The method 500 may be performed by the AR device 120 and/or the processor 405.

The method 500 starts, and in one embodiment, the processor 405 records 501 the window characteristics 203 for the AR view 100 in the previous environment 103a. The processor 405 may record a plurality of previous window characteristics 203 for each environment 103 in which the AR device 120 is employed.

The processor 405 further detects 503 a new AR placetime 233 using the camera 125. The new AR placetime 233 may be different from the most recent previous AR placetime 233. In addition, the new AR placetime 233 may be different from all previous AR placetimes 233. In one embodiment, the new AR placetime 233 is detected from a new AR position 213. For example, if the AR device 120 is used at a new AR position 213, the new AR placetime 233 may be detected.

In addition, the new AR placetime 233 may be detected 503 from a new AR time 231. For example, if the AR device 120 is used at a new AR time 231, the new AR placetime 233 may be detected 503. The new AR placetime 233 may be detected 503 in response to elapsed time from the window timestamp 215 exceeding an elapsed time threshold 225.

In one embodiment, the new AR placetime 233 is detected 503 in response to new AR people 235 in the environment 103. For example, if a new colleague is visible in the AR view 100, a new AR placetime 233 may be detected 503.

The new AR placetime 233 may also be detected 503 from a change in AR context 237. For example, if the AR device 120 was moving in the previous environment 103a and is stationary in the new, current environment 103b, the new AR placetime 233 may be detected 503. In one embodiment, the new AR placetime 233 is detected 503 from a change in any of the window characteristics 203. The new AR placetime 233 may be automatically detected 503.

In response to detecting 503 the new AR placetime 233, the processor 405 may determine 505 whether to redeploy the window 105 within the AR view 100. The window 105 may be redeployed with new window characteristics 203. In one embodiment, the processor 405 queries to reposition the window 105. The processor 405 may query the user as to whether to reposition the window 105. For example, the processor 405 may present a "Reposition Window" option to the user. The processor 405 may determine 505 to redeploy the window 105 in response to an affirmative reply from the user. Thus, the window 105 may be displayed with the new window characteristics 203 in response to being directed to reposition the window 105.

In one embodiment, the processor 405 determines 505 to redeploy the window 105 within the AR view 100 if the usage history 223 and/or user activity 229 of a previous window characteristic 203 is similar to the current activity 227. For example, if the user was previously performing an inspection user activity 229 recorded in a previous window characteristic 203 and the user is now performing an inspection current activity 227, the processor 405 may determine 505 to redeploy the window 105.

In one embodiment, the processor 405 determines 505 to redeploy the window 105 within the AR view 100 if the current time is within a daily time interval of the AR time 231 of a previous window characteristic 203. As used herein, a daily time interval is a range of times on any time and/or a specific day. For example, 10:00 to 12:00 on Monday may be a daily time interval.

In one embodiment, the processor 405 automatically determines 505 to redeploy each window 105 from a most recent previous environment 103 within the AR view 100. For example, if a first window 105 was displayed the last time the AR device 120 was used, the first window 105 is determined to be redeployed.

In one embodiment, the processor 405 determines 505 not to redeploy the window 105 if the elapsed time from the window timestamp 215 exceeds a significant time threshold 225. If the processor 405 determines 505 not to redeploy the window 105, the processor 405 may query 513 the user for new window characteristics 213. For example, the processor 405 may present a user interface that queries 513 for the new window characteristics 213. The processor 405 may further receive the new window characteristics 213 from the user.

If the processor 405 determines 505 to redeploy the window 105, the processor 405 may determine 507 the window preferences 201 for the window 105 displayed at one or more previous AR placetimes 233. In one embodiment, the window preferences 201 are calculated to conform to one or more elements of one or more previous window characteristics 203. In addition, the window preferences 201 may be received from the user.

The processor 405 may calculate 509 the new window characteristics 203 for the window 105. The new window characteristics 203 may be calculated 509 for the new AR placetime 233.

In one embodiment, the new window characteristics 203 are based on one instance of previous window characteristics 203. The one instance of previous window characteristics 203 may be selected based on the current activity 227. For example, the one instance of previous window characteristics 203 may record user activity 229 that is equivalent to the current activity 227 of the user.

In a certain embodiment, the new window characteristics 203 are based on an instance of the previous window characteristics 203 with the usage history 223 that conforms to the current activity 227. In addition, the new window characteristics 203 may be based on an instance of the previous window characteristics 203 with a reposition status 221 that is most similar to the current activity 227. In one embodiment, the new window characteristics 203 are based on an instance of the previous window characteristics 203 with surface characteristics 219 that are most similar to the surface characteristics 219 of the current, new environment 103b.

In one embodiment, the new window characteristics 203 are calculated 509 based on an average, median, and/or mean of the plurality of previous window characteristics 203. In addition, the new window characteristics 203 may be calculated 509 based on an average, median, and/or mean of one or more elements of the plurality of previous window characteristics 203.

The processor 405 may calculate 509 the new window characteristics 203 for the window 105 at a new AR placetime 233 based on previous window characteristics 203. For example, one or more of the window size 205, the window angle 207, the window distance 209, and/or window orientation 211 may be within a similarity threshold 225 of the window size 205, the window angle 207, the window distance 209, and/or window orientation 211 of the previous window characteristics 203. The similarity threshold may be plus or minus 5 to 20 percent. In addition, the new window characteristics 203 may conform to the window preferences 201.

The processor 405 may display 511 the window 105 with the new window characteristics 203 and the method 500 ends. The window 105 may be displayed 511 in the AR view 100 for the new environment 103b.

The embodiments detect the new AR placetime 233 and calculate new window characteristics for the window 105 at the new AR placetime 233 based on previous window characteristics 203. The window 105 is displayed with the new window characteristics 203. As a result, the window 105 and information displayed thereon is automatically available to the user through the AR device 120 when the user moves between environments 103, improving the efficiency and effectiveness of the AR device 120 in presenting information to the user.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a processor;
    a memory that stores code executable by the processor to:
    determine window preferences based on surface characteristics of surfaces to which a plurality of previous window instances for an augmented reality (AR) device were docked, the surface characteristics comprising a surface color, a surface uniformity that records an average deviation from the surface color, and an object density that records a percentage of surface area that includes objects that from discontinuities, the window preferences comprising a window angular size, a docking appearance for appearance of the window on a surface, a window angular orientation, and a window density;
    detect a new AR placetime in response to detecting a new person in an environment of the AR device;
    calculate new window characteristics for a window of the new AR placetime based on the window preferences; and
    display the window with the new window characteristics.

2. The apparatus of claim 1, wherein the code is further executable by the processor to record a plurality of previous window characteristics for the plurality of previous window instances.

3. The apparatus of claim 1, wherein the code is further executable by the processor to:
    query a user to reposition the window; and
    display the window with the new window characteristics in response being directed to reposition the window.

4. The apparatus of claim 1, wherein the code is further executable by the processor to:
    query a user for the new window characteristics; and
    receive the new window characteristics.

5. The apparatus of claim 1, wherein the new AR placetime is further detected in response to an elapsed time from a window timestamp exceeding an elapsed time threshold.

6. The apparatus of claim 1, where the new AR placetime is further detected in response to a new AR context for the AR device of one of a change of the AR device from moving to stationary and a change of the AR device from stationary to moving.

7. The apparatus of claim 1, wherein the new window characteristics conform to a new environment.

8. A method comprising:
    determining, by use of a processor, window preferences based on surface characteristics of surfaces to which a plurality of previous window instances for an augmented reality (AR) device were docked, the surface characteristics comprising a surface color, a surface uniformity that records an average deviation from the surface color, and an object density that records a percentage of surface area that includes objects that from discontinuities, and the window preferences comprising a window angular size, a docking appearance for appearance of the window on a surface, a window angular orientation, and a window density;
    detecting a new AR placetime in response to a new person in an environment of the AR device;
    calculating new window characteristics for a window of the new AR placetime based on the window preferences; and
    displaying the window with the new window characteristics.

9. The method of claim 8, the method further comprising recording a plurality of previous window characteristics for the plurality of previous window instances.

10. The method of claim 8, the method further comprising:
    querying a user to reposition the window; and
    displaying the window with the new window characteristics in response being directed to reposition the window.

11. The method of claim 8, the method further comprising:
    querying a user for the new window characteristics; and
    receiving the new window characteristics.

12. The method of claim 8, wherein the new AR placetime is further detected in response to an elapsed time from a window timestamp exceeding an elapsed time threshold.

13. The method of claim 8, where the AR placetime is further detected in response to a new AR context for the AR device of one of a change of the AR device from moving to stationary and a change of the AR device from stationary to moving.

14. The method of claim 8, wherein the new window characteristics conform to a new environment.

15. A program product comprising a non-transitory computer readable storage medium that stores code executable by a processor, the executable code comprising code to:
    determine window preferences based on surface characteristics of surfaces to which a plurality of previous window instances for an augmented reality (AR) device were docked, the surface characteristics comprising a surface color a surface uniformity that records an average deviation from the surface color, and an object density that records a percentage of surface area that includes objects that form discontinuities, and the window preferences comprising a window angular size, a docking appearance for appearance of the window on a surface, a window angular orientation, and a window density;
    detect a new AR placetime in response to detecting a new person in an environment of the AR device;

calculate new window characteristics for a window of the new AR placetime based on the window preferences; and display the window with the new window characteristics.

16. The program product of claim 15, wherein the code is further executable by the processor to record a plurality of previous window characteristics for the plurality of previous window instances.

17. The program product of claim 15, wherein the code is further executable by the processor to:
   query a user to reposition the window; and
   display the window with the new window characteristics in response being directed to reposition the window.

18. The program product of claim 15, wherein the new AR placetime is further detected in response to an elapsed time from a window timestamp exceeding an elapsed time threshold.

19. The program product of claim 15, where the new AR placetime is further detected in response to a new AR context for the AR device of one of a change of the AR device from moving to stationary and a change of the AR device from stationary to moving.

20. The program product of claim 15, wherein the new window characteristics conform to a new environment.

\* \* \* \* \*